US012761722B2

(12) United States Patent
Li et al.

(10) Patent No.: US 12,761,722 B2
(45) Date of Patent: Oct. 13, 2026

(54) PRESENCE DETECTION WITH DYNAMIC RADAR OPERATING MODES

(71) Applicant: Amazon Technologies, Inc., Seattle, WA (US)

(72) Inventors: Zheda Li, Mountain View, CA (US); Morris Yuanhsiang Hsu, Mountain View, CA (US); Vivek Yenamandra, Santa Clara, CA (US); Aditya V. Padaki, San Jose, CA (US); Raghunandan M Rao, Santa Clara, CA (US); Abhishek Sanaka, San Jose, CA (US); Fnu Rohit Kumar, San Jose, CA (US); Sai Prashanth Chinnapalli, Dublin, CA (US)

(73) Assignee: Amazon Technologies, Inc., Seattle, WA (US)

(*) Notice: Subject to any disclaimer, the term of this patent is extended or adjusted under 35 U.S.C. 154(b) by 388 days.

(21) Appl. No.: 18/066,703

(22) Filed: Dec. 15, 2022

(65) Prior Publication Data

US 2024/0201779 A1 Jun. 20, 2024

(51) Int. Cl.

| | |
|---|---|
| ***G06F 3/01*** | (2006.01) |
| ***G01S 13/04*** | (2006.01) |
| ***H04N 7/025*** | (2006.01) |

(52) U.S. Cl.

CPC .............. *G06F 3/011* (2013.01); *G01S 13/04* (2013.01); *H04N 7/0255* (2013.01)

(58) Field of Classification Search

CPC ........ G06F 3/011; G01S 13/04; H04N 7/0255

See application file for complete search history.

(56) References Cited

U.S. PATENT DOCUMENTS 5,386,480 A * 1/1995 Lo .......................... G01S 3/7865 382/103
11,703,583 B1 * 7/2023 Skeoch ................. G01S 13/886 342/55

(Continued)

FOREIGN PATENT DOCUMENTS

CN 103675811 A * 3/2014 ............. G01S 13/89
WO 2020236148 A1 11/2020

OTHER PUBLICATIONS

R. Nitzberg, "Clutter Map CFAR Analysis," in IEEE Transactions on Aerospace and Electronic Systems, vol. AES-22, No. 4, pp. 419-421, Jul. 1986, doi: 10.1109/TAES.1986.310777. (Year: 1986).*

(Continued)

*Primary Examiner* — Brady W Frazier
*Assistant Examiner* — Noah Yi Min Zhu
(74) *Attorney, Agent, or Firm* — Kilpatrick Townsend & Stockton LLP

(57) ABSTRACT

Techniques for a dynamic radar mode modulation feature are described herein. A computer system associated with a device may implement a first radar configuration for a radar sensor. The first radar configuration may correspond to a first mode and comprise a first frame per second rate and a first difference threshold. The computer system may receive first data from the radar sensor in the first radar configuration. The computer system may determine a presence of an object within a field of view of the radar sensor based on the first data and the first difference threshold. The computer system may instruct the device to turn on based on determining the presence of the user. The radar sensor may be instructed to implement a second radar configuration associated with a second mode.

20 Claims, 10 Drawing Sheets

(56) References Cited

U.S. PATENT DOCUMENTS

| | | | | |
|---|---|---|---|---|
| 11,856,256 | B1 * | 12/2023 | Li | H04N 21/44218 |
| 2015/0309167 | A1 * | 10/2015 | Shikatani | G01S 13/18 342/27 |
| 2015/0338505 | A1 * | 11/2015 | Oshima | G01S 13/66 342/107 |
| 2017/0258319 | A1 * | 9/2017 | Weffers-albu | A61B 3/145 |
| 2018/0203124 | A1 * | 7/2018 | Izzat | G01S 17/89 |
| 2019/0094877 | A1 * | 3/2019 | Smith | G01S 13/60 |
| 2020/0158851 | A1 * | 5/2020 | Suematsu | G01S 13/867 |
| 2020/0356160 | A1 * | 11/2020 | Kosugi | G06F 1/3231 |
| 2021/0026454 | A1 * | 1/2021 | Hong | G06V 40/161 |
| 2021/0088643 | A1 * | 3/2021 | Hayashi | G01S 13/88 |
| 2021/0181328 | A1 * | 6/2021 | Hayashi | G01S 17/04 |
| 2021/0239797 | A1 * | 8/2021 | Cattle | G01S 7/4008 |
| 2021/0293948 | A1 * | 9/2021 | Peng | G01S 7/415 |
| 2022/0225916 | A1 * | 7/2022 | Cho | G01S 13/10 |
| 2022/0413116 | A1 * | 12/2022 | Va | G01S 13/52 |
| 2022/0413120 | A1 * | 12/2022 | Va | G01S 13/42 |
| 2023/0146384 | A1 * | 5/2023 | Terre | G06F 3/04815 345/156 |
| 2023/0168364 | A1 * | 6/2023 | Podkamien | G01S 13/89 701/45 |
| 2023/0333660 | A1 * | 10/2023 | Ali | G01S 13/88 |
| 2023/0341513 | A1 * | 10/2023 | Gianelli | G01S 13/931 |
| 2023/0384420 | A1 * | 11/2023 | Parida | G01S 7/356 |
| 2024/0053468 | A1 * | 2/2024 | Zhou | G01S 7/415 |
| 2024/0061074 | A1 * | 2/2024 | Will | G01S 13/56 |
| 2024/0134026 | A1 * | 4/2024 | Fernandez | G01S 13/18 |
| 2024/0310478 | A1 * | 9/2024 | Sahara | G01S 13/32 |
| 2024/0319323 | A1 * | 9/2024 | Shalita | G01S 13/89 |

OTHER PUBLICATIONS

M. Reznicek, "Doppler CW radar signal processing, implementation and analysis," 2017 International Symposium ELMAR, Zadar, Croatia, 2017, pp. 103-106, doi: 10.23919/ELMAR.2017.8124445. (Year: 2017).*

M. Mabrouk, H. H. Abdullah, K. Hussein and A. H. Hussein, "A Novel Algorithm for Moving/Fixed Target Discrimination in 77 GHz Automotive Radars," 2019 Photonics & Electromagnetics Research Symposium—Fall (PIERS—Fall), Xiamen, China, 2019, pp. 128-133, doi: 10.1109/PIERS-Fall48861.2019.9021394. (Year: 2019).*

A. Safa et al., "A Low-Complexity Radar Detector Outperforming OS-CFAR for Indoor Drone Obstacle Avoidance," in IEEE Journal of Selected Topics in Applied Earth Observations and Remote Sensing, vol. 14, pp. 9162-9175, 2021, doi: 10.1109/JSTARS.2021.3107686. (Year: 2021).*

M. G. Amin and F. Ahmad, "Change Detection Analysis of Humans Moving Behind Walls," in IEEE Transactions on Aerospace and Electronic Systems, vol. 49, No. 3, pp. 1410-1425, Jul. 2013, doi: 10.1109/TAES.2013.6557995. (Year: 2013).*

Li et al., U.S. Appl. No. 17/709,198, "Presence-Detection Modes for Display Devices," filed Mar. 30, 2022.

WO Pub. No. PCT/US2023/083293, "International Search Report and the Written Opinion," Apr. 5, 2024, 12 pages.

* cited by examiner

PRESENCE DETECTION WITH DYNAMIC RADAR OPERATING MODES

BACKGROUND

Streaming devices associated with display devices, such as televisions, may be used to stream or otherwise present a variety of content to users. However, streaming devices and associated display devices may utilize conventional techniques to conserve power. Such conventional techniques include requiring an interaction, such as a touch input from a user or a commend from a control device, to initially be turned on. A similar operation may be required to turn off the display device. Some display devices may utilize a period of time of non-interaction by the user to automatically turn off the display. However, this can result in a display device automatically turning off even though a user is using the display device but not actively interacting with it. For example, a user may be watching a movie on the display device without actually providing any input to the display device.

BRIEF DESCRIPTION OF THE DRAWINGS

Various embodiments in accordance with the present disclosure will be described with reference to the drawings, in which.

DETAILED DESCRIPTION

Figure 1:
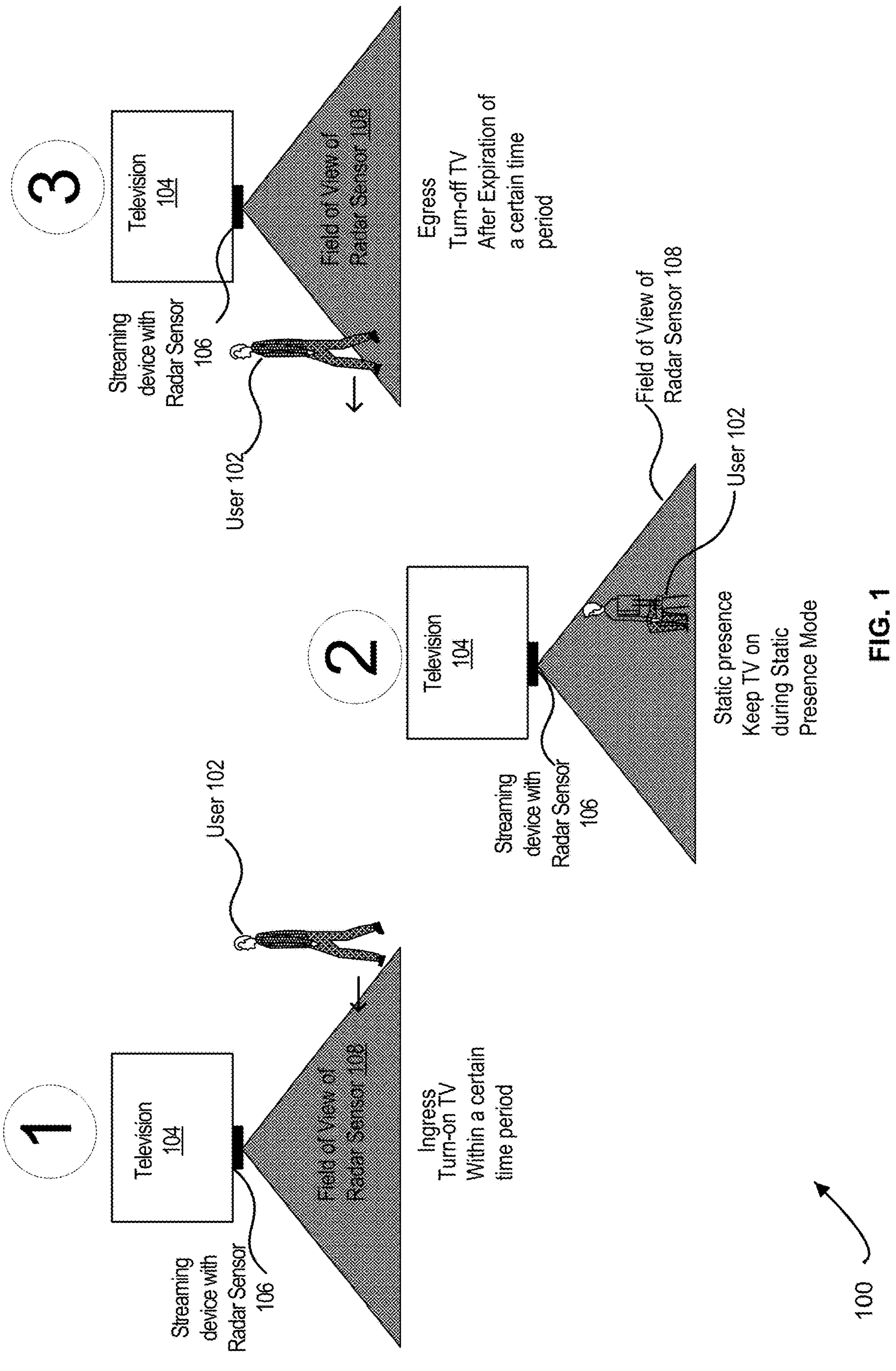
FIG. 1 illustrates example modes for a dynamic radar mode modulation feature, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, implementing a dynamic radar mode modulation feature for modulating a mode of a radar and operating a display device to change states. For example, a computer system (streaming device) communicatively coupled to a radar sensor and the display device may receive data captured by the radar sensor to determine events associated with an object being detected by the radar sensor. In an embodiment, the computer system implementing the dynamic radar mode modulation feature may utilize one or more algorithms with different configurations of parameters and thresholds to determine events associated with the object detected within the field of view of the radar sensor. For example, the computer system may determine a presence of an object in the field of view of the radar sensor (an ingress event), an absence of the object in the field of view of the radar sensor (an egress event), or a static presence of the object in the field of view of the radar sensor (static presence event). In accordance with at least one embodiment, a streaming device configured to receive and present content via the display device may be an example of the computer system. The computer system may include one or more applications or modules for instructing or otherwise controlling the operating state of the display device.

In accordance with at least one embodiment, the computer system may modulate, dynamically, a radar configuration utilized by the radar sensor to detect an event associated with an object in the field of view of the object, the algorithm used to process the data received by the radar sensor, and a state of the display device (e.g., on, off, remain on). For example, the presence of an object, such as a person sitting on a couch in front of their television, may be determined by the computer system based on the data received from the radar sensor. The computer system may utilize a particular configuration of an algorithm to process the data received from the radar sensor to determine the presence of the object (e.g., an ingress event) and generate instructions to modulate various components of the system. To continue the example, in response to determining a presence of an object, the computer system may generate and implement instructions to modulate the radar configuration utilized by the radar sensor such that the radar sensor utilizes a different frame per second rate and threshold of difference, modulate the algorithm to utilize different parameters for another event, such as a static presence event, and operate a state of the display device to turn on. By modulating the operating mode of the radar sensor, display device, and algorithm utilized, the computer system can efficiently turn on or off the display device to facilitate consuming content presented by the display device and thereby conserve power utilized by the display device.

In embodiments, the display device may include, but is not limited to, a television, a monitor, a mobile device, a desktop computer, a laptop, a video game console, a tablet computer, a projector, and/or any other type of device that is able to provide content. The computer system (streaming device) may be associated with, communicatively coupled to the display device, or otherwise integrated into the display device. The radar sensor may include sensors, such as a radar sensor(s), lidar sensor(s), distance sensor(s), imaging device(s), and/or time of flight sensor(s). In accordance with at least one embodiment, the radar sensor is configured to detect objects that are located within a range of the sensor capabilities of the radar sensor and within a field of view of the radar sensor. As will be described herein, the radar sensor, computer system, and display device may operate in various modes, an ingress mode, an egress mode, and a static presence mode. Each mode may be determined by the computer system and modulated between the modes by the computer system based on data received and processed from the radar sensor. As used herein, an "ingress mode/first mode" or "ingress event" corresponds to an event where an object, such as a user, is detected by the radar sensor and the computer system determines that the object is within the field of view of the radar and that the display device should change state—go from an off state to an on state.

The determination of an event or mode by the computer system results in modulating to a different mode or state to prime the radar sensor and computer system to detect a subsequent event. For example, once an ingress event has been determined by the computer system and the display device is turned on, the computer system may generate and implement instructions to modulate the algorithm used to process subsequently received radar data as well as the radar configuration used by the radar sensor to process incoming data. This can result in a dynamic modulation of the devices to conserve power and for the display device as well as react to the user's presence without requiring the user to provide any kind of input or interact with the display device and/or streaming device. As used herein, an "egress mode/third mode" or "egress event" corresponds to an event where an absence of an object, such as a user, is detected by the radar sensor and the computer system determines that no object is within the field of view of the radar. An egress event results in the computer system modulating the algorithm and radar configuration utilized by the radar sensor as well as changing the operating state of the display device to turn off.

As used herein, a "static presence mode/second mode" or "static presence event" corresponds to an event where the radar sensor detects an object within the field of view but very little movement or energy is detected by the radar sensor. A static presence event can correspond to a user sitting or laying down on a couch or chair in view of the display device while consuming content. The minimal movements by the user while consuming the content must be properly interpreted by the computer system or else the computer system may determine an egress event has occurred which would result in the display device turning off. However, upon determining a static presence event has occurred the computer system may instruct the display device to remain in an on state to continue presenting content and avoid turning off the display device while the user is consuming the content. By performing the processes described herein, the computer system and display device are able to switch between various modes using the dynamic radar mode modulation feature to modulate between operating states of the display device and the radar configuration utilized by the radar sensor. The dynamic modulation of these devices, configurations, and implemented algorithms can result in efficient use of the devices to turn on, turn off, or remain on which not only conserves power but results in a pleasurable viewing experience for the user. The user does not have to provide any input or interact with the devices to change the state of the device and instead can focus on viewing the content, leaving the viewing session when they want, or starting a new viewing session by merely moving within detection range or the field of view of the radar sensor. Each mode may be associated with presenting various content. For example, during an ingress event or ingress mode the display device may be configured to present a first set of content that corresponds to content stored locally on the device such as pictures or screen savers. During a static presence event or static presence mode the display device may be configured to present a second set of content that corresponds to streaming content either stored locally or received or retrieved via a network.

FIG. 1 illustrates example modes (1-3) for a dynamic radar mode modulation feature, according to at least one embodiment. The workflow 100 of FIG. 1 includes three scenarios, 1-3, which correspond to different modes implemented by the computer system and radar sensor and events as described herein. FIG. 1 includes a user 102, a television (display device) 104, and a streaming device (computer system) with a radar sensor 106. FIG. 1 also depicts a field of view 108 of the streaming device with a radar sensor 106. Although a certain size and area is depicted in FIG. 1 for the field of view 108 for the streaming device with a radar sensor 106 embodiments of the disclosure are not as limited. For example, the dynamic radar mode modulation feature may include embodiments where multiple radar sensors facing one or more directions from the display device (television 104) are utilized to capture data about objects moving into or out of the field of view of said radar sensors to determine an event or mode to be implemented by the computer system.

Scenario 1 of FIG. 1 corresponds to an ingress event where the user 102 moves within the field of view 108 of the streaming device with radar sensor 106. In response to detecting such a scenario the streaming device with radar sensor 106 may instruct the television 104 to turn on. As depicted in FIG. 1 the ingress event of scenario 1 may be determined and result in the television 104 turning on within a certain time period, such as two seconds of the user 102 entering the field of view 108. As will be discussed in more detail below with reference to FIGS. 3 and 4, the data received by the radar sensor 106 may be processed by the streaming device (also 106) to determine a presence of an object, e.g., the user 102 entering the field of view 108. This determination can result in the streaming device with the radar sensor 106 instructing the television 104 to turn on. Other operations may occur such as modulating the algorithm used to analyze the data provided by the radar sensor 106 as well as a configuration to be utilized by the radar sensor 106. Modulating configurations to be used by the radar sensor 106 can result in changing the speed or rate at which signals are provided by the radar sensor 106 to detect objects within the field of view 108 and thresholds utilized by the radar sensor 106 to filter noise or clutter. Although FIG. 1 depicts the streaming device with radar sensor 106 being integrated into a single component, embodiments described herein include both components as being distinct from each other and communicating via available networks such as the Internet, BLUETOOTH®, NFC, etc.

Scenario 2 of FIG. 1 corresponds to a static presence event where the user 102 remains within the field of view 108 of the streaming device with radar sensor 106. The static presence event of Scenario 2 represents the user 102 consuming or viewing content presented by television 104. In such scenarios the television 104 should remain on despite the user 102 being relatively still or not moving into or out of the field of view of the radar sensor 108. Instead, in response to determining an ingress event has occurred (Scenario 1) the streaming device with radar sensor 106 would have modulated the operating modes of the radar sensor and used a different algorithm. By using a particular radar configuration and algorithm parameter set, the streaming device with radar sensor can accurately detect and process micromovements provided by the user 102 during a static presence event. This can result in the television 104 remaining on and continuing to provide content instead of resulting in an interpretation that no user 102 is present and shutting off the television 104. As the user 102 continues to remain in the field of view 108 of the streaming device with radar sensor 106, the streaming device with radar sensor 106 will continue to operate in the static presence mode. However, the algorithm implemented by the streaming device with radar sensor 106 and radar configuration used by the radar sensor 106 are primed to detect an egress event (Scenario 3).

Scenario 3 of FIG. 1 corresponds to an egress event where the user 102 leaves the field of view 108 of the streaming device with radar sensor 106. The egress event of Scenario 3 represents the user 102 ending a viewing session of content presented by television 104 and leaving the area or proximate area of the television 104. In such a scenario the streaming device with radar sensor 106 may wait a certain amount of time and continue to process the data received by the radar sensor 106 to determine an absence of an object within the field of view 108 (e.g., that the user is no longer consuming the content presented by the television 104). For example, the streaming device with radar sensor 106 may wait a certain amount of time such as one minute, two minutes, 5 minutes, before determining that the user 102 has left the field of view 108 of the radar sensor 106. By waiting a certain amount of time and continuing to detect an absence of an object within the field of view 108 the streaming device with radar sensor 106 can prevent turning off the television 104 prematurely. For example, the user 102 may leave the field of view 108 to grab food or a drink and return to the field of view 108 before the certain amount of time expires resulting in the radar detecting an continued presence of an object and remaining in the static presence mode of Scenario 2. In situations where an absence of an object within the field of view 108 has been determined by the streaming device with radar sensor 106, the streaming device with radar sensor 106 will instruct the television 104 to turn off. The streaming device with radar sensor 106 will also instruct or utilize a different algorithm configuration and radar configuration for the radar sensor 106 to prepare for an ingress event of Scenario 1. The dynamic radar mode modulation feature implemented by the computer system described herein (streaming device with radar sensor 106, for example) results in utilizing real time data captured by the radar sensor 106 to modulate operation not only of the television 104 but the radar sensor such that various scenarios can be detected and dynamic modes for the devices can be implemented.

Figure 2:
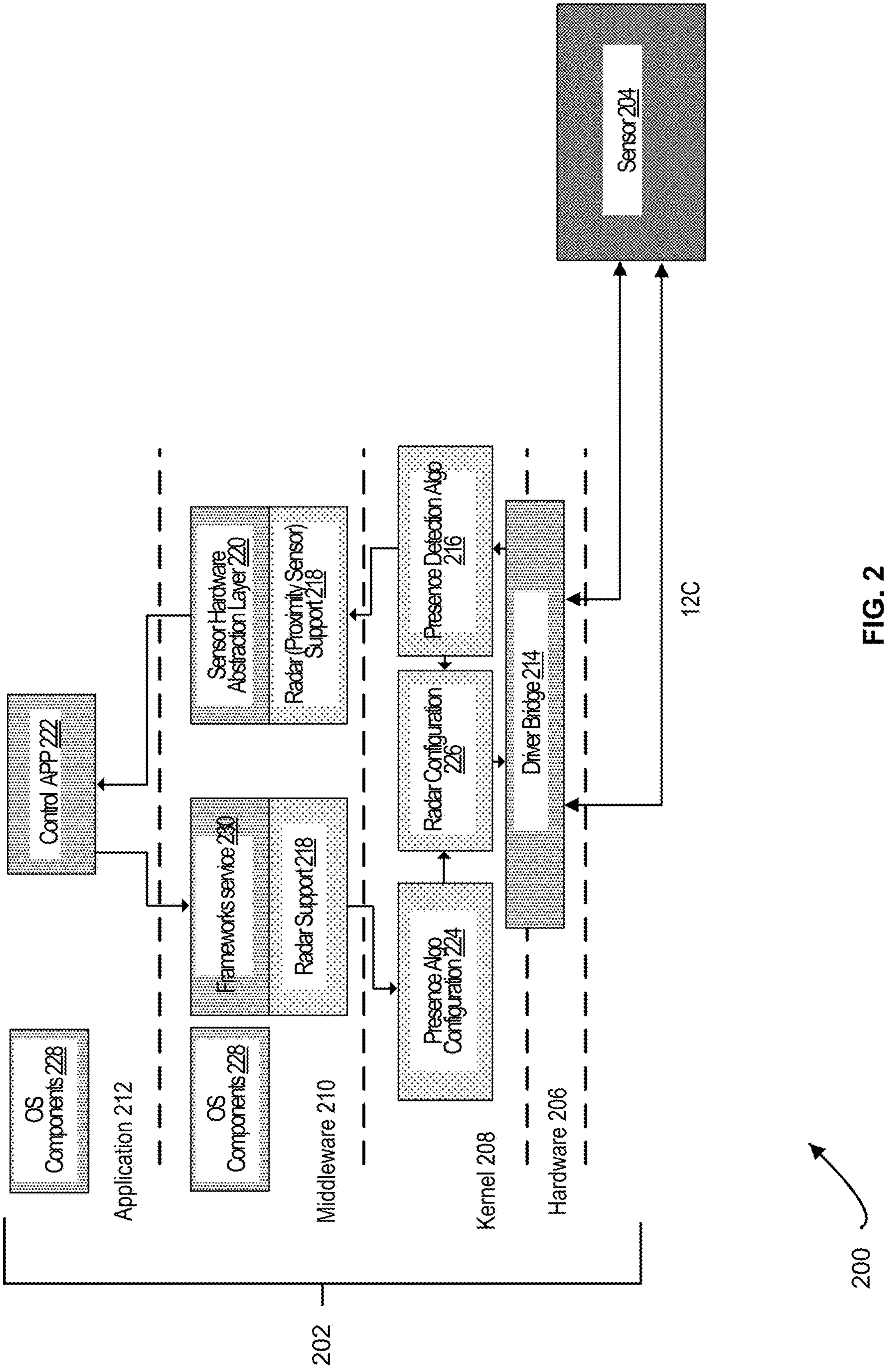
FIG. 2 illustrates an example architecture for implementing a dynamic radar mode modulation feature that includes at least a computer system communicatively coupled to a sensor, according to at least one embodiment.

FIG. 2 illustrates an example architecture 200 for implementing a dynamic radar mode modulation feature that includes at least a computer system 202 communicatively coupled to a sensor 204, according to at least one embodiment. As depicted in FIG. 2, the architecture 200 includes various architecture layers such as a hardware layer 206, a kernel layer 208, a middleware layer 210, and an application layer 212. Although FIG. 2 depicts certain modules and/or applications located in certain layers 206-212, embodiments disclosed herein are not limited to such a distribution. Some, all, or any combination of the modules and/or applications may be integrated into another layer. As depicted in FIG. 2, the sensor 204, which may include a radar sensor, may transmit or otherwise communicate post processed radar data to the computer system 202 via a driver bridge 214. In embodiments, the driver bridge 214 may include an inter-integrated circuit (I2C) driver bridge. The processing of the data captured by the sensor 204 and the post processed data provided to the computer system 202 is described in more detail below with reference to FIG. 3.

As described below with reference to FIG. 9, the computer system 202 may utilize various modules or applications to process the data provided by the sensor 204 and determine an event or mode for the computer system 202, sensor 204, and associated display device. For example, the presence detection algorithm 216 may be configured to utilize the data from the sensor 204 and driver bridge 214 to determine an event has occurred (ingress, egress, static presence), modulate the modes for the devices, and communicate with radar proximity sensor support module 218 and sensor hardware abstraction layer 220 to instruct control application 222 to affect the operating mode of the associated display device. For example, in the architecture 200 depicted in FIG. 2, the control application 222 may be configured, at the application layer 212, to directly communicate or otherwise instruct an associated display device (not pictured) to change state, from on to off, from off to on, or to remain in an on state. The presence detection algorithm 216 may not be configured to directly communicate with and instruct the display device directly from the kernel layer 208. Similarly, the presence detection algorithm 216 may utilize radar proximity sensor support module 218 to integrate with the display device at the middleware layer 210.

In embodiments, the presence detection algorithm 216 may be configured, along with the presence algorithm configuration module 224 to update the radar configuration 226 utilized by radar sensor 204. For example, the radar configuration 226 module may be configured to instruct or otherwise change an operating mode for the radar sensor 204 to utilize different frame per second rates, thresholds of difference, and time windows to capture data. In embodiments, the presence algorithm configuration module 224 may be configured to update the presence detection algorithm 216 to utilize different parameters, functions, or thresholds to properly analyze data provided by the sensor 204 which corresponds to the current mode set for the computer system 202 and sensor 204. For example, a first radar configuration and algorithm may be implemented to properly detect an ingress event which is different from a second radar configuration and updated algorithm which is implemented to properly detect a static presence event. In embodiments, OS components 228 may be configured to interact with the computer system 202 and/or display device at an operating system level such as to present content. The frameworks service module 230 and radar support 218 may be configured to communicate with presence algorithm configuration module 224 to provide state information for the display device as well as whether an instructed command for operating the display device was properly executed.

Figure 3:
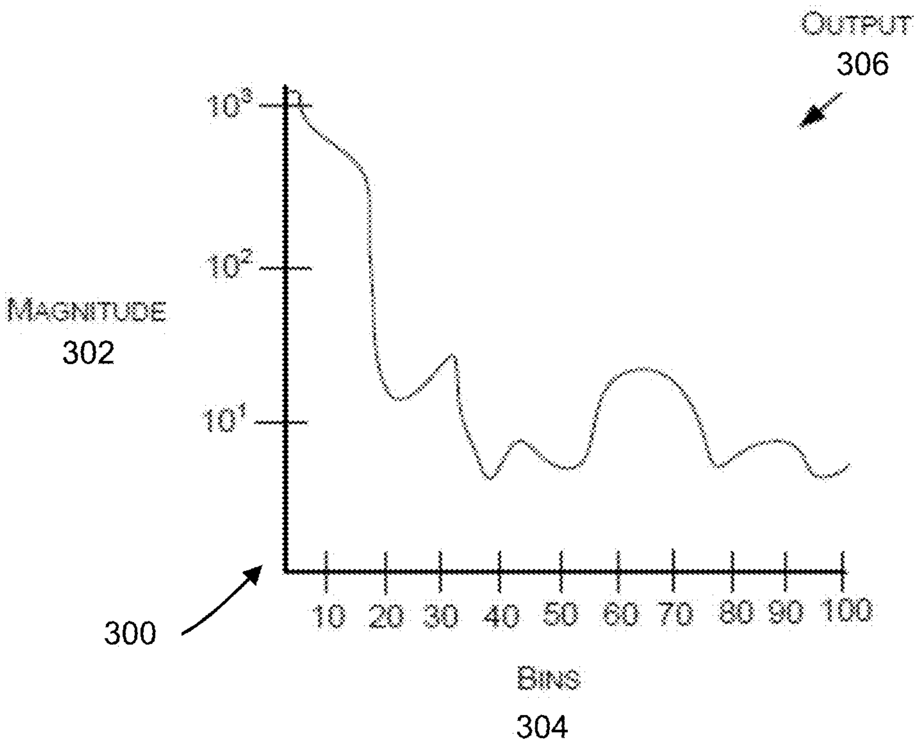
FIG. 3 illustrates an example of determining a presence of an object which may include determining a distance to an object using a radar sensor for a dynamic radar mode modulation feature, according to at least one embodiment.
Figure 3:
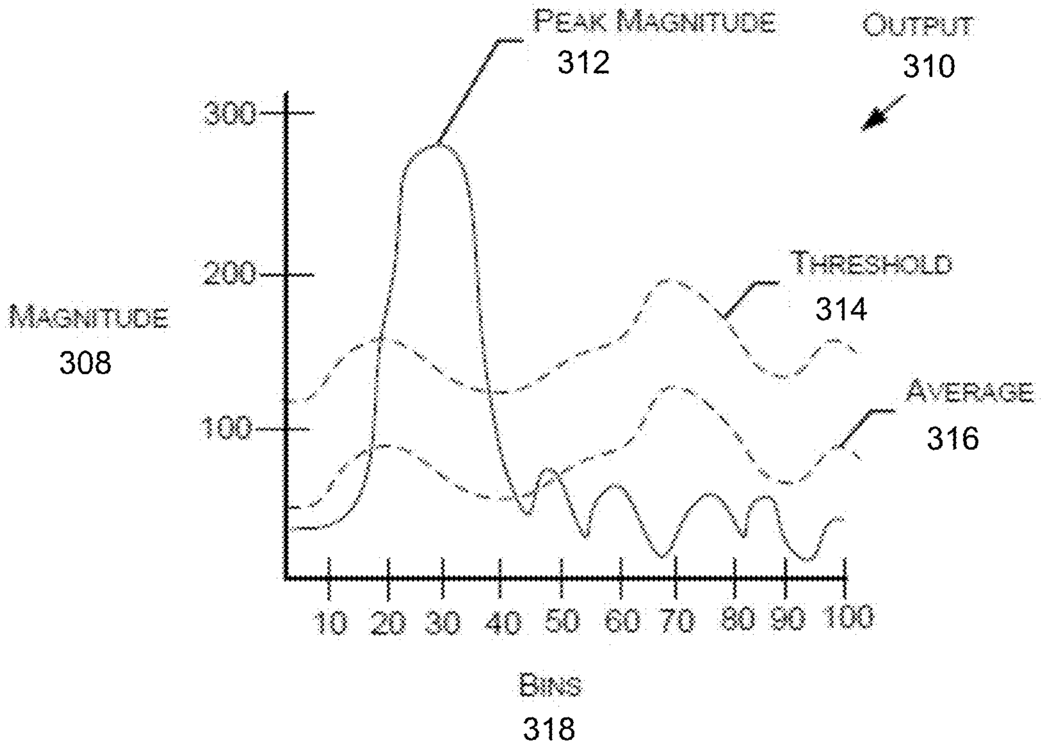

FIG. 3 illustrates an example of determining a presence of an object which may include determining a distance to an object using a radar sensor for a dynamic radar mode modulation feature, according to at least one embodiment. FIG. 3 depicts a first graph 300 which includes magnitude 302 on the Y-axis and bins 304 on the X-axis as well as output data 306 which represents the magnitude 302 for an object detected by a radar sensor associated with or communicatively coupled to a computer system. The output data 306 may represent more than one previous frame received by a radar sensor. The graph at 308 represents a subtraction of noise or background noise by a static object canceller thereby generating output 310. The graph 308 includes peak magnitude 312, threshold 314, average 316, and bins 318. The threshold 314 may include a magnitude level that must be surpassed by a magnitude of a signal to be considered outside the range of noise or clutter detected by the radar sensor.

For example, the threshold 314 may be generated using one or more algorithms, such as a constant false alarm rate (CFAR) algorithm. For instance, the threshold may be generated by taking an average 316 of the magnitudes detected by the radar sensor over a period of time such as one minute, five minutes, one hour, one day, etc. In some embodiments, the threshold 314 may be generated by multiplying the average 316 by a given multiplier such as 1.2, 1.5, 2, 3, and/or any other multiplier. The radar sensor may analyze the output 312 to identify at least one peak magnitude that satisfies the threshold 314. The difference between peak magnitudes 312 of consecutive frames generated by the radar sensor within a certain time window may be provided to the computer system for determining whether an object has been detected within the field of view of the radar sensor.

For example, during a certain radar configuration which corresponds to an ingress mode, which would result in the radar sensor utilizing a high threshold 314 as well as greater frame per second rate (e.g., 10 FPS), may result in providing to the computer system large differences between peak magnitudes detected by the radar sensor. The large difference between the peak magnitudes may be compared to a currently utilized threshold of difference. The difference between peak magnitudes of consecutive frames may correspond to the post processed data provided by the radar sensor to the computer system via the I2C driver bridge or I2C bridge. As described herein, the computer system may utilize certain algorithm parameters for certain algorithms which correspond to certain modes which include using certain thresholds of difference to determine whether a predicted event has occurred. For example, an egress event would correspond to a low threshold of difference occurring over a large period of time. To continue the example, an ingress event would correspond to a high threshold of difference being exceeded by differences between peak magnitudes over a shorter period of time. The computer system may instruct a radar sensor to utilize different radar configurations to detect different events which may occur given a current event state for the components implementing the dynamic radar mode modulation feature.

Figure 4:
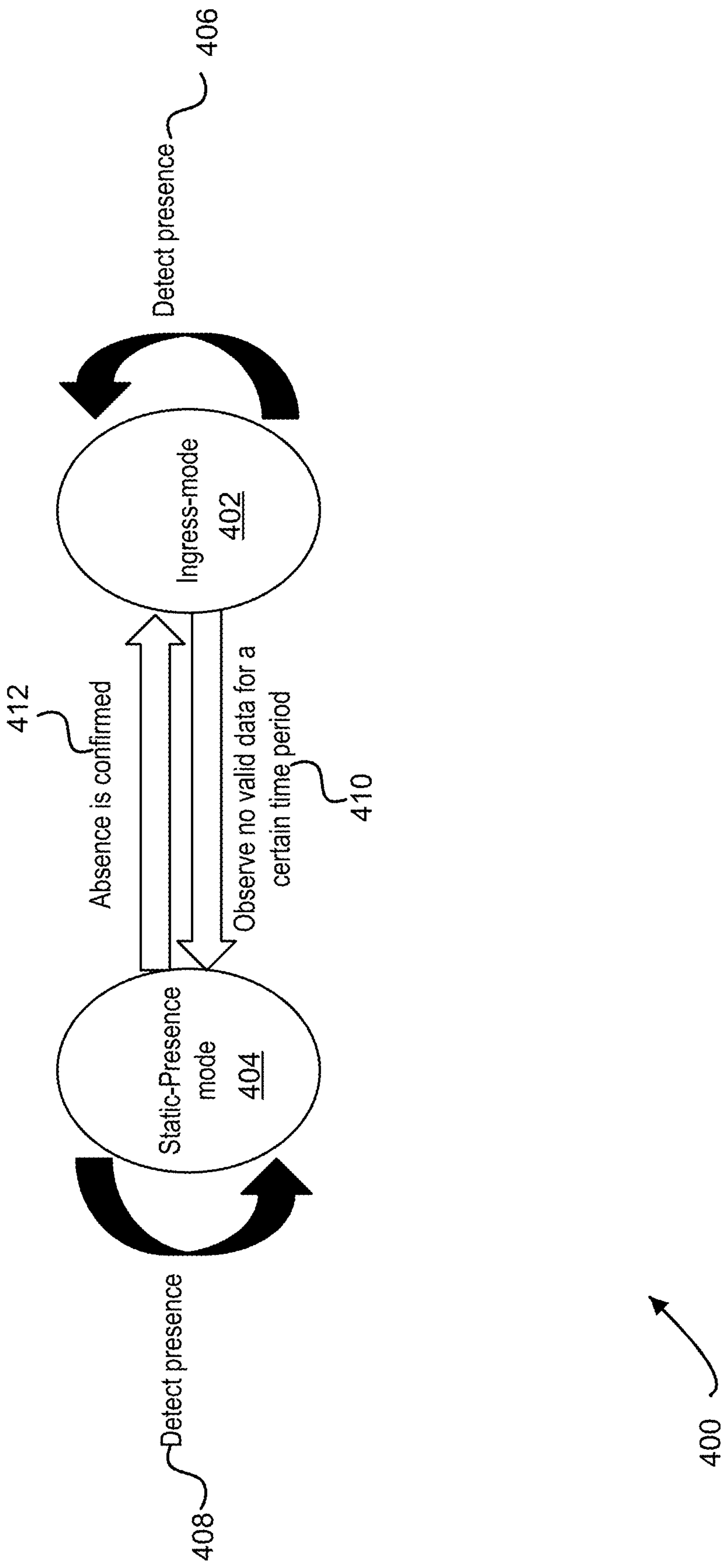
FIG. 4 illustrates an example workflow for a dynamic radar mode modulation feature, according to at least one embodiment.

FIG. 4 illustrates an example workflow 400 for a dynamic radar mode modulation feature, according to at least one embodiment. The workflow 400 depicts the transition between two modes, ingress mode 402 and static presence mode 404. The workflow 400 includes detect presence events 406 and 408 which may occur upon the computer system analyzing data provided by the radar sensor using a certain configuration of an algorithm and threshold of difference to determine a presence, absence, or static presence of an object within a field of view of the radar sensor. The workflow 400 depicts a fast awareness determination of an ingress event (ingress mode 402) by detecting strong motion or movement—which is represented by large differences between peak magnitudes of consecutive frames within a short time window or period. Once a determination that an ingress event has occurred, ingress mode 402, the computer system may continue to use the same algorithm and radar configuration to determine an absence of an object within field of view of the radar sensor. By utilizing the same higher threshold and radar configuration or an ingress event the computer system can determine that a user has placed themselves in front of the display device as the computer system is no longer detecting large motions or movement by the user using the algorithm and radar configuration associated with an ingress event. After determining an absence of the object using the radar configuration and data from the radar sensor that is associated with an ingress event detection, the computer system may instruct the radar to utilize a different radar configuration to detect a static presence event, resulting in a transition to the static presence mode 404. This is represented in FIG. 4 by 410 in which no high peak magnitude differences are observed for a certain time period.

Once the computer system and radar sensor are configured for a static presence mode 404, the radar sensor continues to receive data and the computer system analyzes the data using the algorithm parameters or configuration for detecting a static presence event. This can result in detecting and analyzing micromotions or small movements generated by a user as they breath or slightly move during viewing of content presented by a display device. Detecting the static presence event results in maintaining an on operating state for the display device. The workflow 400 of FIG. 4 also depicts confirming, by the computer system, an absence of an object 412 which corresponds to an egress event. Upon determining the absence of an object within the field of view of the radar sensor the computer system may update the algorithm configuration as well as the radar configuration to put them both in the ingress mode 402 to expect another ingress event. The determination of an absence of an object 412 may occur upon analyzing the radar data over a certain period of time that does not exceed a threshold of difference even under the lower threshold utilized in the static presence mode 404. The certain period of time for determining an absence of the object may be longer than determining the presence of an object to result in less false determinations that the user is not present and turning off of the display device. As described herein, determining an absence of the user event 412 results in the computer system instructing the display device to turn off.

Figure 5:
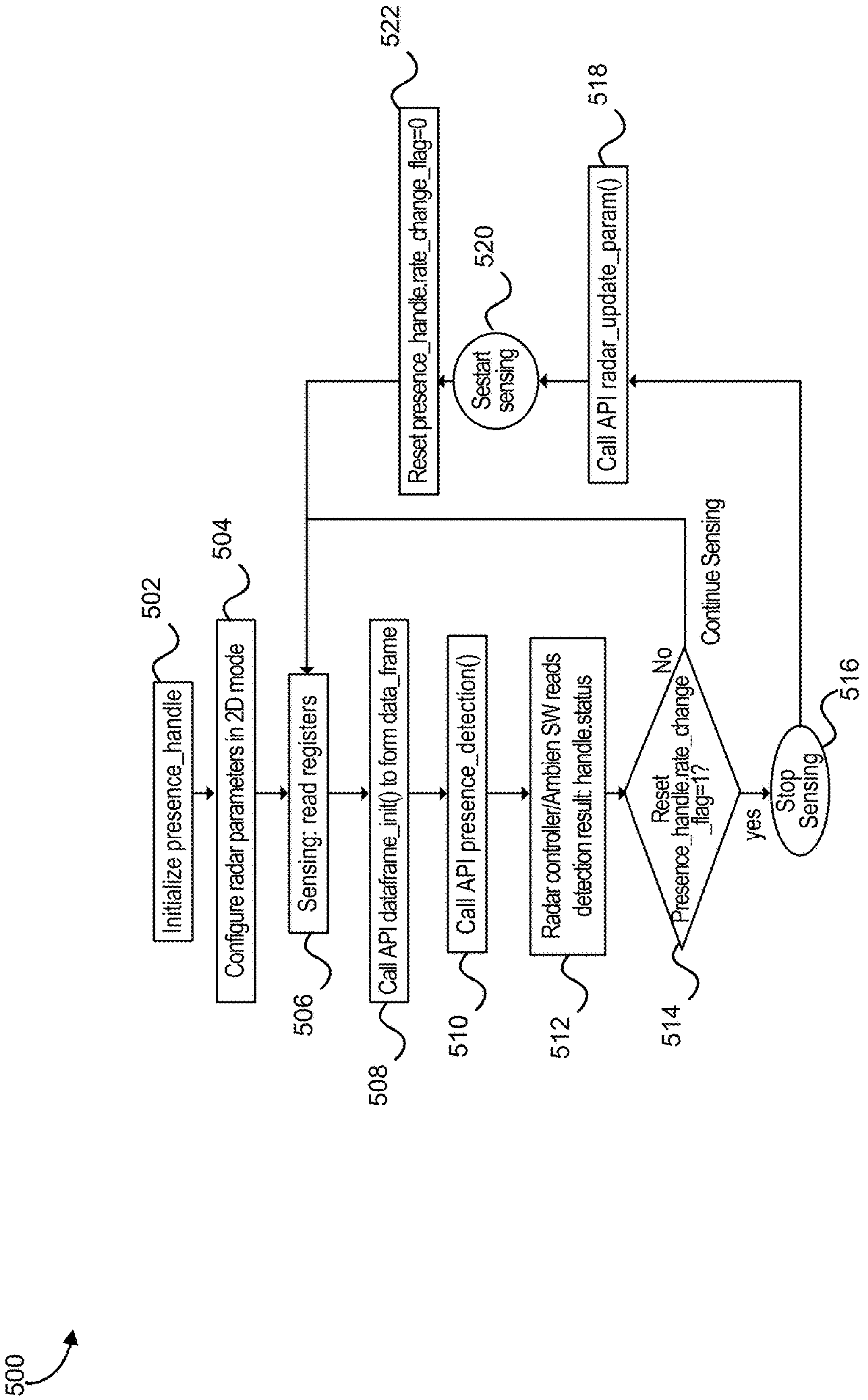
FIG. 5 illustrates an example flowchart for a dynamic radar mode modulation feature, according to at least one embodiment.

FIG. 5 illustrates an example flowchart 500 for a dynamic radar mode modulation feature, according to at least one embodiment. The flowchart 500 includes initializing a presence handle at 502 which results in setting the algorithm configuration and radar sensor configuration in an ingress mode. The flowchart 500 includes configuring the radar parameters in a two dimensional (2D) mode at 504 for detecting objects within the field of view of the radar sensor using a certain radar configuration such as the radar configuration associated with an ingress mode. The flowchart 500 includes sensing the read registers at 506 which can result in updating the radar configuration and algorithm configuration utilized by the computer system and radar sensor. The flowchart 500 includes calling an application programming interface (API) to form data frames for analyzing frames of data received by the radar sensor at 508. The flowchart 500 includes calling the API presence detection to begin detecting frames from the radar sensor at 510.

The flowchart 500 includes communicating with the radar controller at 512 to read detection results from the radar sensor, such as differences between consecutive frames of peak magnitudes. At 514 of the flowchart 500 a determination is made to reset the presence handle rate change flag for the radar sensor. If the flag sensor is set to 1, then the radar sensor continues setting and the flowchart 500 returns to step 506. If however, the flag is set to 1, then the radar sensor stops sensing at 516 of the flowchart 500. The stopping of the sensing at 516 provides an opportunity to update the parameters or configuration utilized by the radar sensor to detect objects within the field of view of the radar sensor. For example, during a transition between an ingress mode to a static presence mode. The flowchart 500 includes calling an API radar update parameter function at 518 to update the configuration for the radar sensor, followed by an instruction to begin sensing again at 520 by the radar sensor for objects within the field of view. The flowchart 500 then continues at 522 by resetting the presence handle rate change flag to 0 such that the radar sensor will continue detecting objects within the field of view and collecting data until a determination that an event has occurred which results in setting the flag to 1.

Figure 6:
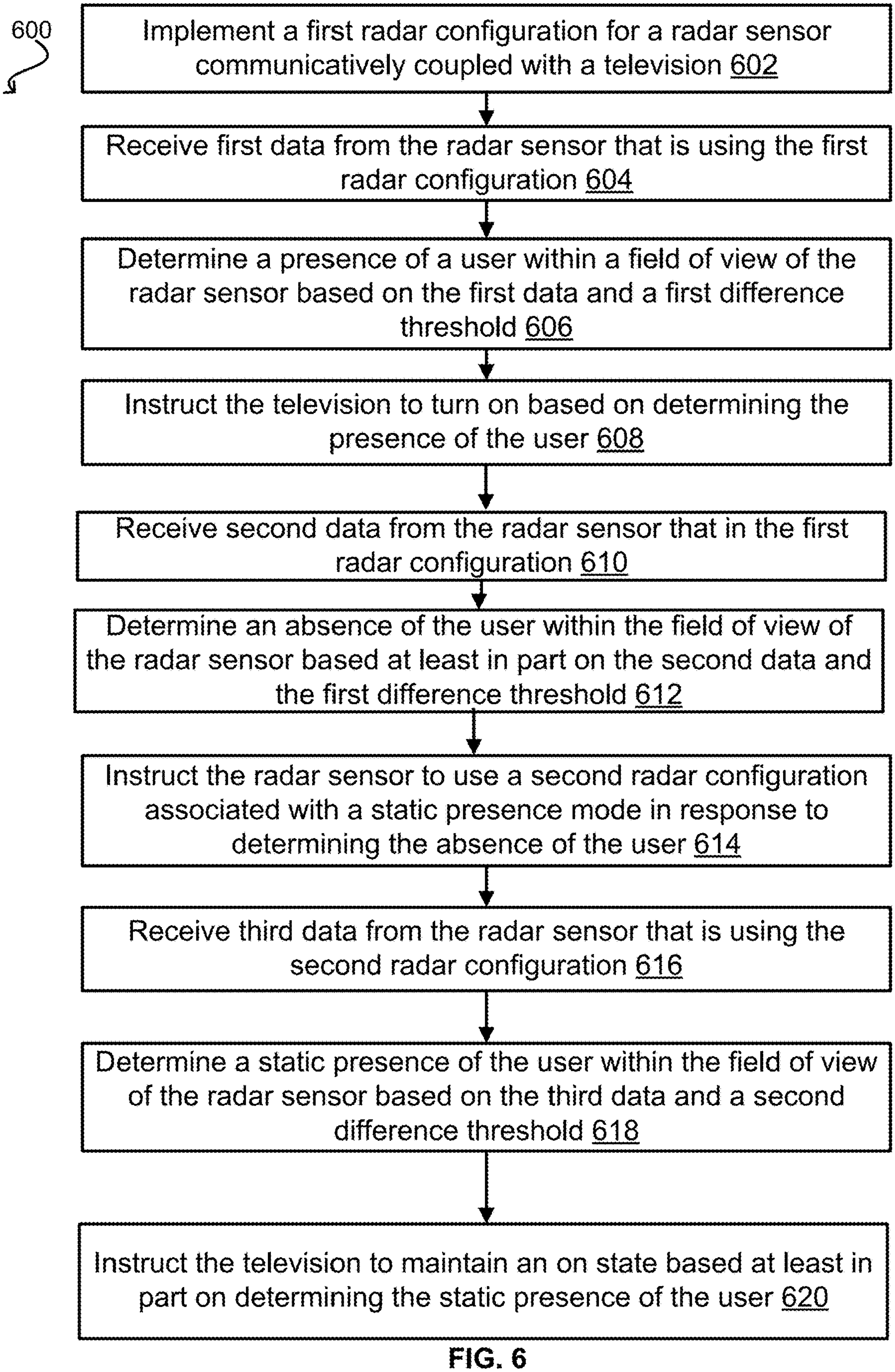
FIG. 6 illustrates an example flow diagram for a dynamic radar mode modulation feature, according to at least one embodiment.
Figure 7:
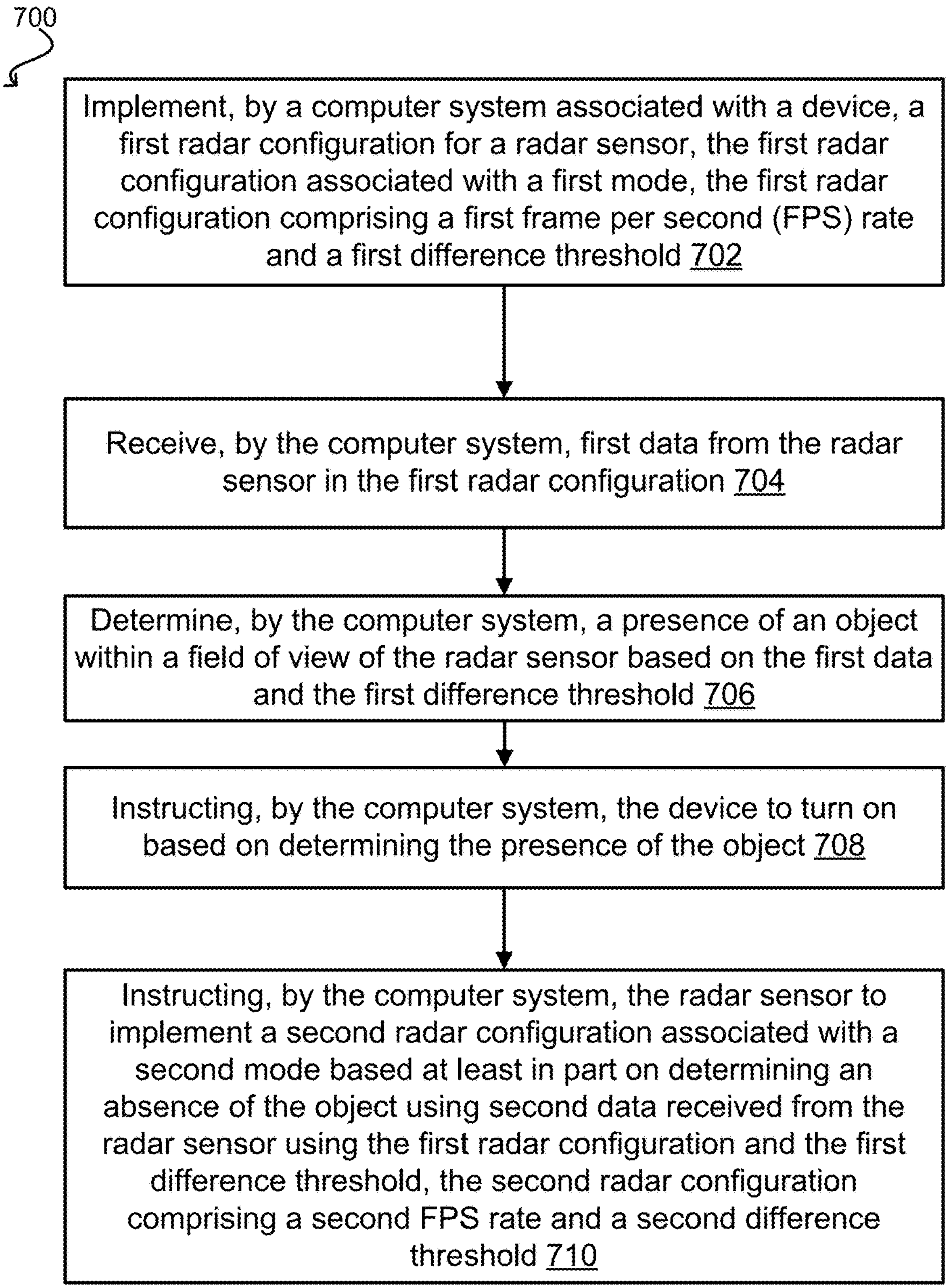
FIG. 7 illustrates an example flow diagram for a dynamic radar mode modulation feature, according to at least one embodiment.
Figure 8:
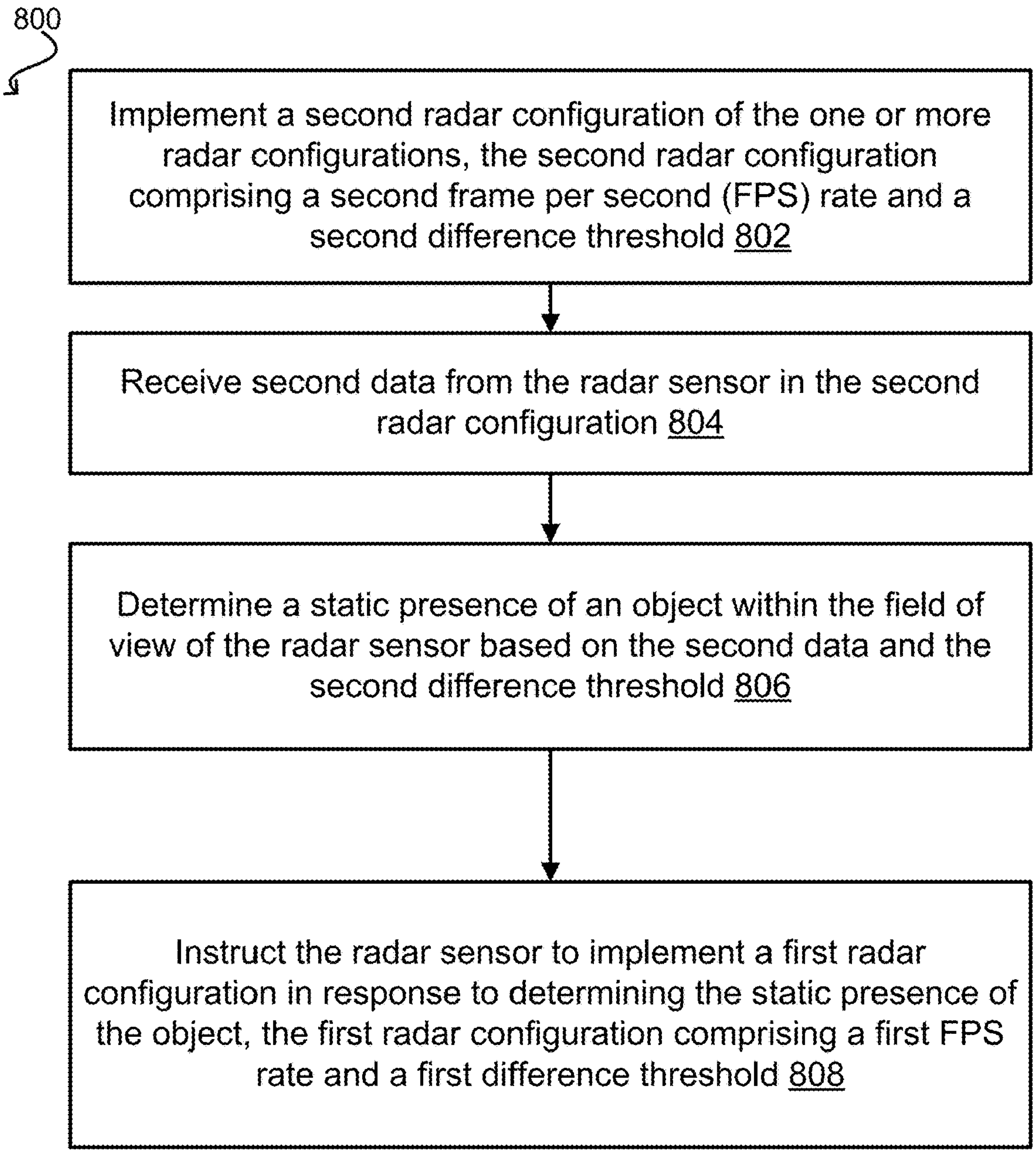
FIG. 8 illustrates an example flow diagram for a dynamic radar mode modulation feature, according to at least one embodiment.

FIGS. 6-8 illustrate example flow diagrams for modulating parameters for an algorithm and modes for a radar sensor using a dynamic radar mode modulation feature on a computer system. The computer system can be any of the computer systems described herein including a streaming device communicatively coupled to or otherwise associated with a radar sensor and a display device (e.g., television). Some or all of the instructions for performing the operations of the flow diagrams can be implemented as hardware circuitry and/or stored as computer-readable instructions on a non-transitory computer-readable medium of the computer system. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

FIG. 6 illustrates an example flow diagram for a dynamic radar mode modulation feature with a computer system (streaming device or television), according to at least one embodiment. In an example, the flow starts at 602, where the computer system implements a first radar configuration for a radar sensor communicatively coupled with a television. In embodiments the first radar configuration is associated with an ingress mode and comprises a first frame per second (FPS) rate and a first difference threshold. In accordance with at least one embodiment, the first FPS rate may include a higher FPS rate than the second FPS rate utilized in a second radar configuration that is associated with a static presence mode. For example, the first FPS rate may include 10 FPS, 20 FPS, or 30 FPS whereas the second FPS rate may include 1 FPS or 2 FPS. In embodiments the first difference threshold may be greater than the second difference threshold. The higher threshold for the first difference threshold, which corresponds to the ingress mode, is utilized by the dynamic radar mode modulation feature to account for a higher rate of movement and energy detected by the signals produced by the radar sensor. The higher threshold of the first difference threshold can be used to filter out any false positive events which do not correspond to an object moving within the field of view of the radar sensor.

The flow includes, at 604, receiving first data from the radar sensor that is using the first radar configuration. As described herein, the radar sensor may be configured to process the raw data obtained by the radar sensor and provide post processed data to the computer system which includes differences between frames of signals generated by the radar sensor within a certain time window.

The flow includes, at 606, determining a presence of a user within a field of view of the radar sensor based at least in part on the first data and a first difference threshold. In embodiments, an algorithm may be instructed to utilize certain parameters or expect certain data that corresponds to the first radar configuration and the first data in order to properly determine an ingress event is occurring. For example, the differences in magnitudes of signals in the first data may need to exceed the first difference threshold in order for the computer system to determine a presence of the object.

The flow includes, at 608, instructing the television to turn on based on determining the presence of the user. In embodiments, the computer system may utilize several architecture layers such as a kernel layer, middleware, etc., which requires communication to certain applications in order to interact with the hardware (e.g., turn on the television). In embodiments, a software application may be located or implemented in an application layer of the computer system which directly interacts with an operating system of the computer system and can implement instructions such as turning on the display device (television) or turn off the display device.

The flow includes, at 610, receiving second data from the radar sensor in the first radar configuration. In embodiments, the computer system and radar sensor continue to utilize a radar configuration and algorithm for detecting ingress events.

The flow includes, at 612, determining an absence of the user within the field of view of the radar sensor based at least in part on the second data and the first difference threshold. The computer system may determine, using the parameters, thresholds, and algorithm analysis associated with an ingress event that a user is no longer moving or providing a large motion associated with an ingress event. This determination can lead to transitioning the algorithm and radar sensor to a configuration better suited to detect a static presence event.

The flow includes, at 614, instructing the radar sensor to use a second radar configuration associated with a static presence mode in response to determining the absence of the user. In embodiments, the second radar configuration comprises a second frame per second rate and a second difference threshold.

The flow includes, at 616, receiving third data from the radar sensor that is using the second radar configuration.

The flow includes, at 618, determining a static presence of the user within the field of view of the radar sensor based on the third data and a second difference threshold of the second radar configuration. In embodiments, the computer system may instruct an algorithm to update (updated algorithm) such that it utilizes certain parameters and/or expects certain data to determine that a static presence event is occurring.

The flow includes, at 620, instructing the television to maintain an on state based at least in part on determining the static presence of the user.

FIG. 7 illustrates an example flow diagram for a dynamic radar mode modulation feature with a computer system (streaming device) that is associated with a device (display device) and a radar sensor, according to at least one embodiment. In an example, the flow starts at 702, by implementing, by the computer system, a first radar configuration for the radar sensor, where the first radar configuration is associated with an ingress (first) mode and comprises a first FPS rate and a first difference threshold.

The flow includes, at 704, receiving, by the computer system, first data from the radar sensor in the first radar configuration.

The flow includes, at 706, determining, by the computer system, a presence of an object within a field of view of the radar sensor based on the first data and the first difference threshold.

The flow includes, at 708, instructing, by the computer system, the device to turn on based on determining the presence of the user.

The flow includes, at 710, instructing, by the computer system, the radar sensor to implement a second radar configuration associated with a static presence (second) mode based at least in part on determining an absence of the object using second data received from the radar sensor using the first radar configuration and the first difference threshold, the second radar configuration comprising a second FPS rate and a second difference threshold. In embodiments, the computer system may be configured to determine that an egress event has occurred (the object has left the field of view of the radar sensor and data received by the radar sensor does not exceed the second difference threshold). For example, the computer system may receive third data from the radar sensor in the second radar configuration. The computer system may determine an absence of the object within the field of view of the radar sensor based on the third data and the second difference threshold.

In response to determining the absence of the user the computer system may instruct the device to turn off the device. As described herein, the computer system may implement certain hardware and/or software modules at different system architecture levels. For example, the computer system may implement a radar support module in a middleware layer of the computer system that is configured to transmit the instructions to the software application of the device for turning the display device on or off or presenting content. In an embodiment, the computer system may implement a presence algorithm configuration module in a kernel layer of the computer system that is configured to update the radar configurations utilized by the radar sensor in response to the instructions by the computer system. The algorithm utilized by the computer system may be implemented in the kernel layer of the computer system.

FIG. 8 illustrates an example flow diagram for a dynamic radar mode modulation feature with a computer system (streaming device) that is associated with a device (display device) and a radar sensor, according to at least one embodiment. In an example, the flow starts at 802, by implementing a second radar configuration of the one or more radar configurations, the second radar configuration associated with a static presence mode and comprising a second FPS rate and a second difference threshold.

The flow includes, at 804, receiving second data from the radar sensor in the second radar configuration. In embodiments, the first data, second data, and third data are transmitted, by the radar sensor and to the computer system, via an inter-integrated circuit (I2C) driver bridge or bridge.

The flow includes, at 806, determining the static presence of an object within the field of view of the radar sensor based on the second data and the second difference threshold.

The flow includes, at 808, instructing the radar sensor to implement a first radar configuration associated with an ingress mode in response to determining the static presence of the object, the first radar configuration comprising a first FPS rate and a first difference threshold.

Figure 9:
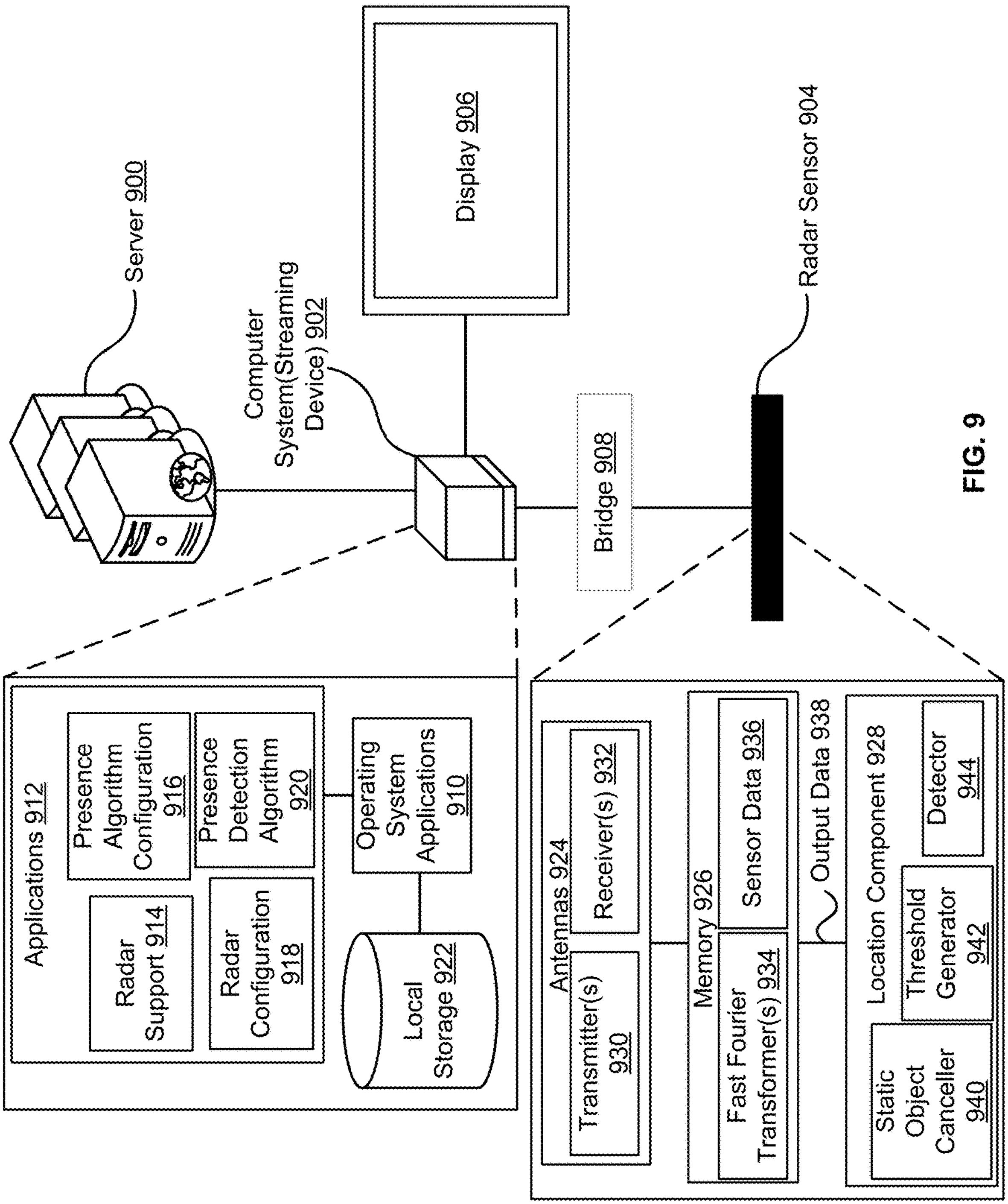
FIG. 9 illustrates an example architecture for implementing a dynamic radar mode modulation feature that includes at least a server, computer system, radar sensor, and display, according to at least one embodiment.

FIG. 9 illustrates an example architecture for implementing a dynamic radar mode modulation feature that includes at least a server 900, computer system 902, radar sensor 904, and display 906, according to at least one embodiment. In embodiments, the computer system 902 may be communicatively coupled to the server 900 and radar sensor 904. In accordance with at least one embodiment, the output or data from the radar sensor 904 may be communicated to the computer system 902 via bridge 908. The computer system 902 may be an example of a computer system described herein as well as a streaming device, the display 902 may be an example of a device, display device, or television as used herein, and the radar sensor 904 may be an example of the radar sensor used herein. In embodiments, the display 906 may be configured to present content provided by server 900 and/or computer system 902. Computer system 902 and server 900 may communicate via one or more available networks such as the Internet. Although not pictured, the server 900 may communicate directly with display 906 via available networks such as the Internet to present content in response to instructions from the computer system 902. The computer system 902 may utilize an application such as one or more operating system applications 910 to instruct the display 906 to turn on, turn off, or remain on in response to determining an event has occurred such as an ingress event, an egress event, or a static presence event.

In embodiments, the computer system 902 may implement one or more applications 912 which include radar support 914, presence algorithm configuration 916, radar configuration 918, and presence detection algorithm 920. Although the computer system 902 of FIG. 9 is depicted utilizing applications 912, each of radar support 914, presence algorithm configuration 916, radar configuration 918, and presence detection algorithm 920 may be implemented as software, hardware, or modules (software or hardware modules). The computer system 902 may include local storage 922 for storing one or more parameters, data, or other input for modulating a radar configuration or mode for the radar sensor 904. In accordance with at least one embodiment, radar support 914 may be configured to receive instructions from presence detection algorithm 920 and transform or otherwise transmit the instructions to the operating system applications 910 for executing commands at an application or operating system level for the computer system 902 and/or display 906. For example, the instructions may correspond to turning on the display 906 or turning off the display 906.

In embodiments, the presence algorithm configuration 916 may be configured to generate and transmit instructions to the radar configuration 918 for updating a radar configuration to use by the radar sensor 904 as well as update the parameters, functions, thresholds, and/or input utilized by presence detection algorithm 920 for processing the received data from the radar sensor 904 via bridge 908. For example, the presence algorithm configuration 916 may maintain one or more radar configurations as well as one or more algorithms to utilize based on the mode determined by the computer system 902 to utilize (e.g., ingress, egress, static mode). As described above, the radar configuration 918 may be configured to maintain, update, and instruct or otherwise update the frame rate per second rate and thresholds utilized by the radar sensor 904 to process incoming data captured by the radar sensor 904.

The presence detection algorithm 920 may be configured to receive and process data from the radar sensor 904 transmitted via bridge 908 and determine, using a certain radar configuration, an event associated with the data. For example, the presence detection algorithm 920 may be configured to determine a presence of an object (ingress event), an absence of an object (egress event), or a static presence of an object (static presence event) based on the particular implemented algorithm, the current radar configuration, and the received data from the radar sensor 904. Based on determining a certain state of an object or occurrence of an event, instructions may be generated by the presence detection algorithm 920 and computer system 902 to update the current radar configuration (radar configuration 918), the current algorithm utilized (presence algorithm configuration 916) as well as tasks to be performed with the display 906 via the radar support 914 and operating system applications 910.

FIG. 9 also includes radar sensor 904 which includes antennas 924, memory 926, and location component 928. In embodiments, the antennas 924 includes transmitter(s) 930 and receiver(s) 932. The memory 926 may include at least one Fast Fourier Transformer(s) (FFT(s)) 934 as well as sensor data 936 that is generated by receiver(s) 932. In some embodiments, the receiver(s) 932 may include the transmitter(s) 930 instead of being separate entities. In accordance with at least one embodiment, each frame output by the transmitter(s) 930 consists of a signal that represents a chirp. The transmitter(s) 930 output the signal, which is reflected off of at least one object, and then received by the receiver(s) 932, which generate the sensor data 936 representing the signal. In embodiments, the sensor data 936 is then transmitted to the fast Fourier transformer(s) 934 for processing. For example, the FFT(s) 934 may include one or more algorithms that are configured to convert a time domain and/or space domain from the signal to a representation in a frequency domain. The output is a measure of how strong the reflected signal is at a specific distance from the display 906 and/or radar sensor 904. In some embodiments, each frequency bin of the FFT(s) 934 corresponds to a physical distance away from the display 906 and/or radar sensor 904. The output data 938 may represent a magnitude of the frequency of the signal output by the transmitter(s) 930.

In accordance with at least one embodiment, the radar sensor 904 and location component 928 may use the output data 938 to determine a distance of a possible object relative to the display 906 and/or radar sensor 904. For example, since the output data 938 represents the magnitude for all objects, a static object canceller 940 may be configured to subtract output data 938 representing a previous frame (and/or output data 938 representing more than one previous frame) from current output data 938. Based on the subtraction, the static object canceller 940 may generate an output that represents a magnitude of dynamic objects within the field of view of radar sensor 904. In embodiments, the threshold generator 942 may use one or more thresholds of difference to determine if an object is detected by determining whether a detected magnitude exceeds the threshold. In embodiments the detector 944 may determine a difference between magnitude peaks of frames according to a specified frame per second rate and provide the differences between the magnitude peaks as data to the computer system 902 via bridge 908 for processing using the presence detection algorithm 920. In embodiments, the bridge 908 may include an I2C bridge. The presence detection algorithm 920 may use the data to determine a presence of an object, absence of an object, or static presence of an object and perform modulation of a radar mode for the radar sensor 904 as well as perform an operation via the display 906 such as turning the display 906 on or off. In embodiments, the detector 944 may analyze the output data 938 to determine a distance to the object from the display 906 and/or radar sensor 904.

Figure 10:
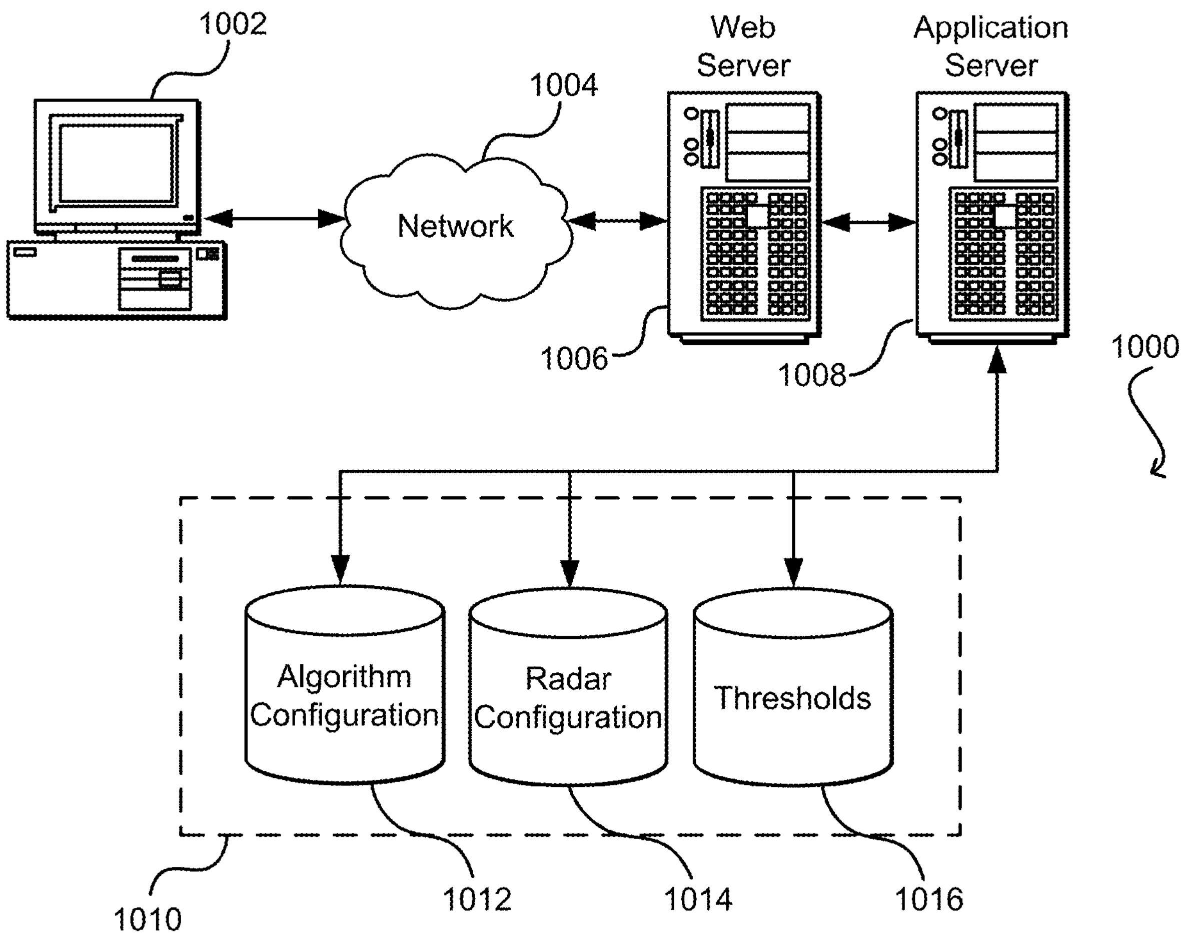
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests, serving content, determining presence of an object, static presence of an object, or absence of an object, and generating a response thereto, although for other networks an alternative device serving a similar purpose could be used as would be apparent to one of ordinary skill in the art. In embodiments, the client device 1002 includes the computer system (streaming device) described herein. The client device 1002 may be coupled to or communicatively coupled to a radar sensor (not pictured) and/or display (device) (not pictured) for presenting content.

In some examples, cell phones (or, more broadly, mobile phones) may be one specific type of mobile device that is an example of the electronic client device 1002. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 1006 or other servers over the network 1004 or other networks.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application as well as generating or otherwise providing content, implementing and updating algorithms or other tasks described herein with reference to the computer system. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing algorithm configuration(s) 1012 and thresholds 1016, which can be used to serve content for the production side as well as configure implemented algorithms to utilize certain parameters or data such as particular thresholds from the thresholds 1016 which correspond to different radar configurations (1014) and radar modes for detecting or determining different events (e.g., ingress, static presence, or egress). The data store also is shown to include a mechanism for storing radar configuration(s) 1014, which can be used for reporting, analysis, or other such purposes such as specifying instructions and parameters for a radar sensor to utilize when obtaining data (first data, second data, and/or third data). It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser. In another example, the radar sensor, through the client device 1002 and network 1004, may provide data obtained by the radar sensor using a certain radar configuration from the radar configuration(s) 1014, to the web server 1006 and application server 1008. In embodiments, the web server 1006 and/or application server 1008 may utilize one or more implemented algorithms along with parameters or attributes specified by the algorithm configuration(s) 1012 to determine an event associated with the data along with comparing the data to a threshold of difference as specified in thresholds 1016. For example, the algorithm may determine a presence of an object using the specific algorithm, data, and threshold. In response to determining an event has occurred (ingress, egress, static presence) the web server 1006 and/or application server 1008 may update the algorithm configuration 1012 to be utilized, obtain a radar configuration from radar configuration 1014, and a certain threshold 1016. The web server 1006 and/or application server 1008 may transmit instructions, via network 1004, to update the radar configuration utilized by the radar sensor associated with the client device 1002 as well as the threshold to utilize.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

implementing, by a television, a first radar configuration for a radar sensor communicatively coupled with the television, the first radar configuration associated with an ingress mode and comprising a first frame per second (FPS) rate and a first difference threshold, wherein the first difference threshold is based at least in part on an average magnitude of radar signal returns detected by the radar sensor over a period of time and a multiplier;

receiving, by the television, first data comprising at least two consecutive frames, wherein the at least two consecutives frames comprise output data of radar signal returns from the radar sensor that is using the first radar configuration;

determining, by the television, a presence of a user within a field of view of the radar sensor based at least in part on whether a difference between a peak magnitude of radar signal returns in a first frame of the first data and a peak magnitude of radar signal returns in a second frame of the first data exceeds the first difference threshold;

instructing, by the television, the television to turn on based at least in part on determining the presence of the user;

receiving, by the television, second data from the radar sensor that is using the first radar configuration;

determining, by the television, an absence of the user within the field of view of the radar sensor based at least in part on the second data and the first difference threshold;

implementing, by the television, a second radar configuration associated with a static presence mode in response to determining the absence of the user, the second radar configuration comprising a second FPS rate and a second difference threshold;

receiving, by the television, third data from the radar sensor that is using the second radar configuration;

determining, by the television, a static presence of the user within the field of view of the radar sensor based at least in part on the third data and the second difference threshold; and instructing, by the television, to maintain an on state for the television based at least in part on determining the static presence of the user.

2. The computer-implemented method of claim 1, further comprising:

receiving, by the television, fourth data from the radar sensor that is using the second radar configuration;

determining, by the television, the absence of the user within the field of view of the radar sensor based at least in part on the fourth data and the second difference threshold; and instructing, by the television, the television to turn off based at least in part on determining the absence of the user.

3. The computer-implemented method of claim 1, wherein determining the presence of the user and determining the static presence of the user is based at least in part on the first data and the third data, the first data and the third data including differences between peak magnitudes of frequencies associated with signals generated by the radar sensor, the first difference threshold including a first threshold magnitude, the second difference threshold including a second threshold magnitude that is different than the first threshold magnitude, wherein determining the presence of the user is further based at least in part on the differences between the peak magnitudes of the frequencies associated with the signals generated by the radar sensor of the first data exceeding the first threshold magnitude of the first difference threshold, and wherein determining the static presence of the user is further based at least in part on the differences between the peak magnitudes of the frequencies associated with the signals generated by the radar sensor of the third data exceeding the second threshold magnitude of the second difference threshold.

4. The computer-implemented method of claim 1, wherein instructing the radar sensor to use the second radar configuration comprises using the second difference threshold, the second difference threshold being configurable.

5. The computer-implemented method of claim 1, wherein the first FPS rate is greater than the second FPS rate.

6. A computer-implemented method, comprising:

implementing, by a computer system associated with a device, a first radar configuration for a radar sensor, the first radar configuration associated with a first mode, the first radar configuration comprising a first frame per second (FPS) rate and a first difference threshold, wherein the first difference threshold is based at least in part on an average magnitude of radar signal returns detected by the radar sensor over a period of time and a multiplier;

receiving, by the computer system, first data comprising at least two consecutive frames, wherein the at least two consecutive frames comprise output data of radar signal returns from the radar sensor in the first radar configuration;

determining, by the computer system, a presence of an object within a field of view of the radar sensor based at least in part on whether a difference between a peak magnitude of radar signal returns in a first frame of the first data and a peak magnitude of radar signal returns in a second frame of the first data exceeds the first difference threshold;

instructing, by the computer system, the device to turn on based at least in part on determining the presence of the object; and implementing, by the computer system, a second radar configuration associated with a second mode based at least in part on determining an absence of the object using second data received from the radar sensor using the first radar configuration and the first difference threshold, the second radar configuration comprising a second FPS rate and a second difference threshold.

7. The computer-implemented method of claim 6, further comprising:

receiving, by the computer system, third data from the radar sensor in the second radar configuration;

determining, by the computer system, a static presence of the object within the field of view of the radar sensor based at least in part on the third data and the second difference threshold; and instructing, by the computer system, the device to maintain an on state based at least in part on determining the static presence of the object.

8. The computer-implemented method of claim 6, further comprising:

receiving, by the computer system, fourth data from the radar sensor in the second radar configuration;

determining, by the computer system, the absence of the object within the field of view of the radar sensor based at least in part on the fourth data and the second difference threshold; and instructing, by the computer system, the device to turn off based at least in part on determining the absence of the object.

9. The computer-implemented method of claim 6, wherein the first FPS rate comprises ten frames per second, and the second FPS rate comprises one frame per second.

10. The computer-implemented method of claim 6, further comprising implementing, by the computer system, a radar support module in a middleware layer of the computer system, the radar support module configured to transmit instructions to a software application of the device.

11. The computer-implemented method of claim 10, further comprising implementing, by the computer system, a presence algorithm configuration module in a kernel layer of the computer system, the presence algorithm configuration module configured to update radar configurations utilized by the radar sensor in response to instructions by the computer system.

12. The computer-implemented method of claim 6, wherein determining the presence of the object is implemented by an algorithm executed in a kernel layer of the computer system.

13. The computer-implemented method of claim 6, further comprising instructing, by the computer system, a software application of the device to present a first set of content in response to the first mode and instructing the software application to present a second set of content in response to the second mode.

14. A computer system comprising:

a processor;

a radar sensor configured to capture data within a field of view of the radar sensor using one or more radar configurations; and a memory storing computer-readable instructions that, upon execution by the processor, configure the computer system to:

implement a second radar configuration of the one or more radar configurations, the second radar configuration comprising a second frame per second (FPS) rate and a second difference threshold, wherein the second difference threshold is based at least in part on an average magnitude of radar signal returns detected by the radar sensor over a period of time and a multiplier;

receive second data comprising at least two consecutive frames, wherein the at least two consecutive frames comprise output data of radar signal returns from the radar sensor in the second radar configuration;

determine a static presence of an object within the field of view of the radar sensor based at least in part on whether a difference between a peak magnitude of radar signal returns in a first frame of the second data and a peak magnitude of radar signal returns in a second frame of the second data exceeds the second difference threshold, the computer system associated with a device configured to present content; and implement a first radar configuration in response to determining the static presence of the object, the first radar configuration comprising a first FPS rate and a first difference threshold.

15. The computer system of claim 14, wherein the memory stores additional computer-readable instructions that, upon execution by the processor, further configure the computer system to:

receive first data from the radar sensor in the first radar configuration;

determine a presence of the object within the field of view of the radar sensor based at least in part on the first data and the first difference threshold; and instruct the device to maintain an on state based at least in part on determining the presence of the object.

16. The computer system of claim 15, wherein the memory stores additional computer-readable instructions that, upon execution by the processor, further configure the computer system to:

receive third data from the radar sensor in the first radar configuration;

determine an absence of the object within the field of view of the radar sensor based at least in part on the third data and the first difference threshold; and instruct the radar sensor to implement the second radar configuration.

17. The computer system of claim 15, wherein determining the presence of the object within the field of view of the radar sensor occurs during a first time period.

18. The computer system of claim 17, wherein determining the static presence of the object within the field of view of the radar sensor occurs during a second time period, the second time period being greater than the first time period.

19. The computer system of claim 14, wherein the memory stores additional computer-readable instructions that, upon execution by the processor, further configure the computer system to:

receive third data from the radar sensor in the second radar configuration;

determine an absence of the object within the field of view of the radar sensor based at least in part on the third data and the second difference threshold; and instruct the device to turn off based at least in part on determining the absence of the object.

20. The computer system of claim 19, wherein the data from the radar sensor is transmitted to the computer system via a driver bridge.

* * * * *